US010791327B2

United States Patent
Pettersson et al.

(10) Patent No.: US 10,791,327 B2
(45) Date of Patent: Sep. 29, 2020

(54) ENCODING AND DECODING A PICTURE BLOCK

(71) Applicant: Telefonaktiebolaget LM Ericsson (publ), Stockholm (SE)

(72) Inventors: Martin Pettersson, Vallentuna (SE); Rickard Sjöberg, Stockholm (SE); Per Wennersten, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/764,947

(22) PCT Filed: Dec. 27, 2017

(86) PCT No.: PCT/SE2017/051350
§ 371 (c)(1),
(2) Date: Mar. 19, 2019

(87) PCT Pub. No.: WO2019/004888
PCT Pub. Date: Jan. 3, 2019

(65) Prior Publication Data
US 2019/0208198 A1 Jul. 4, 2019

Related U.S. Application Data

(60) Provisional application No. 62/527,471, filed on Jun. 30, 2017.

(51) Int. Cl.
*H04N 19/11* (2014.01)
*H04N 19/593* (2014.01)
(Continued)

(52) U.S. Cl.
CPC .......... *H04N 19/11* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

2009/0257492 A1* 10/2009 Andersson ........... H04N 19/105
375/240.12
2013/0301718 A1* 11/2013 Amon ................. H04N 19/176
375/240.12
(Continued)

FOREIGN PATENT DOCUMENTS

WO WO 2016/182317 A1 11/2016
WO WO 2017/093604 A1 6/2017
(Continued)

OTHER PUBLICATIONS

International Search Report and Written Opinion of the International Searching Authority, PCT/SE2017/051350, dated Apr. 27, 2018, 14 pages.
(Continued)

*Primary Examiner* — Christopher Braniff
(74) *Attorney, Agent, or Firm* — Sage Patent Group

(57) ABSTRACT

A method of encoding a block of a picture into a video bitstream is provided. The method is performed by a video encoder and comprises encoding a first block of the picture, determining an intra-prediction mode for a second block of the picture, for which second block the intra-prediction is made from pixels in the first block along a non-straight line, encoding the second block using the determined intra-prediction mode, and signaling syntax elements for the second block in the video bitstream.

22 Claims, 12 Drawing Sheets

(51) Int. Cl.
*H04N 19/105* (2014.01)
*H04N 19/70* (2014.01)
*H04N 19/159* (2014.01)
*H04N 19/176* (2014.01)
*H04N 19/46* (2014.01)

(52) U.S. Cl.
CPC ........... *H04N 19/176* (2014.11); *H04N 19/46* (2014.11); *H04N 19/593* (2014.11); *H04N 19/70* (2014.11)

(56) References Cited

U.S. PATENT DOCUMENTS

| | | | |
|---|---|---|---|
| 2016/0073107 A1* | 3/2016 | Moon | H04N 19/11 375/240.12 |
| 2019/0082179 A1 | 3/2019 | Ahn et al. | |
| 2019/0191155 A1 | 6/2019 | Ko et al. | |

FOREIGN PATENT DOCUMENTS

| | | | |
|---|---|---|---|
| WO | WO2017093604 | * | 6/2017 |
| WO | WO 2017/222237 A1 | | 12/2017 |
| WO | WO 2018/199793 A1 | | 11/2018 |

OTHER PUBLICATIONS

Jani Lainema et al, Intra Coding of the HEVC Standard, IEEE Transactions on Circuits and Systems for Video Technology, Dec. 2012, 10 Pages, vol. 22, No. 12.

European Search Report for European Application No. 17915852.2, dated Mar. 4, 2020, 4 pages.

Mei-Juan Chen et al., "Spatial and Temporal Error Concealment Algorithms of Shape Information for MPEG-4 Video", IEEE Transactions on Circuits and Systems for Video Technology, Institute of Electrical and Alectronics Engineers, US, vol. 15, No. 6, Jun. 1, 2005, XP011132925, pp. 778-783.

* cited by examiner

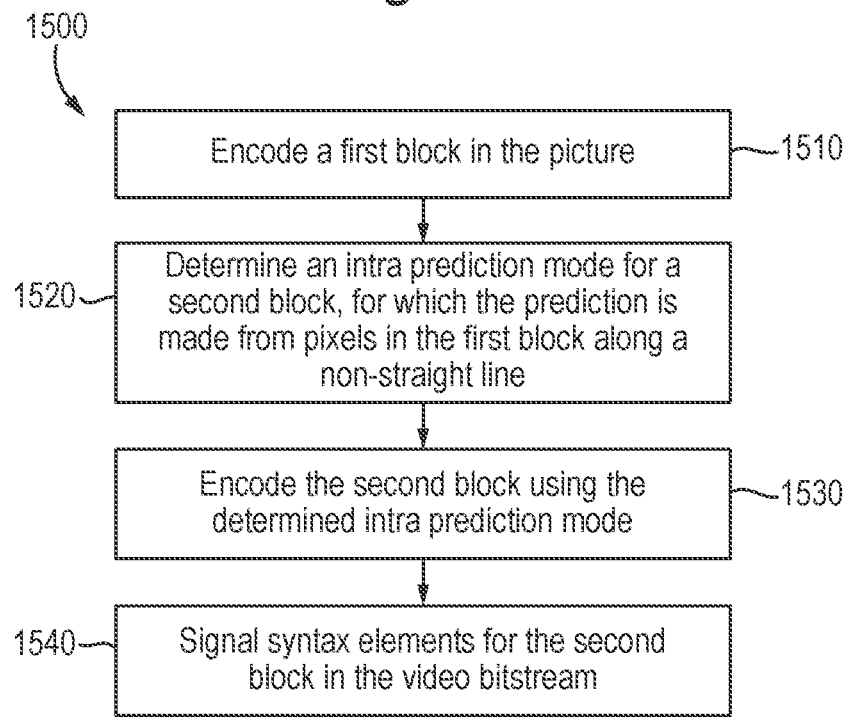
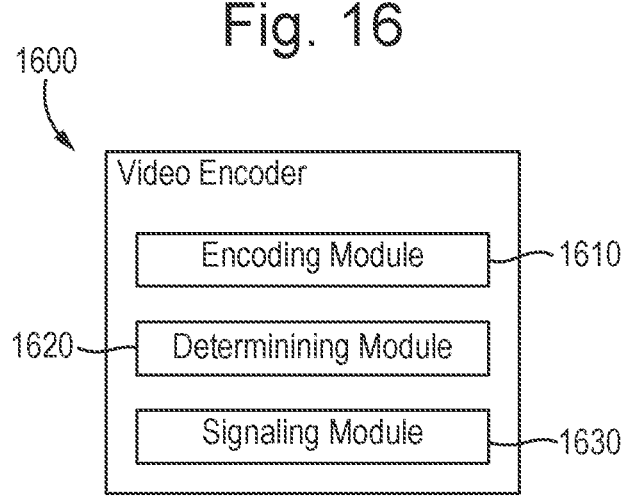

ENCODING AND DECODING A PICTURE BLOCK

CROSS REFERENCE TO RELATED APPLICATIONS

This application is a 35 U.S.C. § 371 national stage application of PCT International Application No. PCT/SE2017/051350 filed on Dec. 27, 2017, which in turns claims domestic priority to U.S. Provisional Patent Application No. 62/527,471, filed on Jun. 30, 2017, the disclosures and content of which are incorporated by reference herein in their entirety.

TECHNICAL FIELD

The invention relates to a method of encoding a block of a picture into a video bitstream, a method of decoding a block of a picture of a video bitstream, a corresponding computer program, a corresponding computer program product, a video encoder for encoding a block of a picture into a video bitstream, and a video decoder for decoding a block of a picture of a video bitstream.

BACKGROUND

High Efficiency Video Coding (HEVC) is a block-based video codec standardized by the Telecommunication Standardization Sector of the International Telecommunications Union (ITU-T) and the Moving Picture Experts Group (MPEG) that utilizes both temporal and spatial prediction. Spatial prediction is achieved using intra-prediction (I) from within the current picture. Temporal prediction is achieved using inter-(P) or bi-directional (B) inter-prediction on block level from previously decoded reference pictures. The difference between the original pixel data and the predicted pixel data, referred to as the residual, is transformed into the frequency domain, quantized, and then entropy coded before it is transmitted together with necessary prediction parameters, such as mode selections and motion vectors, which also are entropy coded. By quantizing the transformed residuals, the tradeoff between bitrate and quality of the video may be controlled. The level of quantization is determined by the Quantization Parameter (QP). The decoder performs entropy decoding, inverse quantization, and inverse transformation, to obtain the residual, and then adds the residual to an intra- or inter-prediction to reconstruct a picture.

MPEG and ITU-T have recently started the development of the successor to HEVC within the Joint Video Exploratory Team (JVET). In the exploration phase, an experimental software codec called JVET Exploratory Model (JEM) is used, which is based on the HEVC reference codec software HM (HEVC Test Model).

HEVC has 35 different intra-prediction modes. Mode 0, the planar mode, uses interpolation of the bordering pixels from the left- and top-neighboring blocks. Mode 1, the DC mode, uses the average of the neighboring pixels as prediction for each pixel of the current block. The remaining 33 modes are angular modes, where each mode defines a direction in which the neighboring pixels are extended. For each intra-predicted block, one of the 35 modes is selected for encoding the block. The different angular modes are illustrated in FIG. 1A. FIG. 1B illustrates how pixels of an intra-predicted block are extended, i.e., predicted, from neighboring blocks along a certain direction. Since the pixels are extended from the left, the left-neighboring bordering pixels are first projected from the top reference pixels, before extending the reference pixels from the top for the prediction of the block.

The intra-prediction modes in HEVC are coded using three Most Probable Modes (MPMs). A list of MPMs is populated for each block and derived in the following order:
1. The mode of the above-neighboring block
2. The mode of the left-neighboring block
3. Planar mode
4. DC mode
5. Angular mode 26

Duplicates are removed and the top three modes are used as the most probable modes. In the case the current intra-prediction mode is equal to one of the modes in the MPMs list, prev_intra_luma_pred_flag is set to 1 and an index 0, 1 or 2, is signaled in the bitstream. If the current intra-prediction mode is not equal to a mode in the MPMs list, the prev_intra_luma_pred_flag is set to 0 and the selected mode is signaled using a 5-bit fixed-length code.

In the current version of JEM, 6.0, the number of angular modes has been extended to 66 to increase the granularity of the possible directions for intra-prediction. The number of MPMs has also been extended to six, since the number of intra-prediction modes has increased. The MPMs list for JEM is populated in the following order, with duplicates removed, until six modes have been reached:
1. The mode of the left-neighboring block
2. The mode of the above-neighboring block
3. Planar mode
4. DC mode
5. The mode of the below-left neighboring block
6. The mode of the above-right neighboring block
7. The mode of the above-left neighboring block
8. −1/+1 of the already included angular modes
9. Vertical mode
10. Horizontal mode
11. Mode 2
12. Diagonal mode Subpixel filtering of reference pixels is applied for the angular modes in HEVC and JEM. When the directional arrow starts exactly at a reference pixel, the reference pixel is simply copied to the current position of the block to be encoded. If it does not point exactly at one reference pixel, the pixel sample $P_{x,y}$ for the prediction is interpolated from the two closest reference pixels, $R_{i,0}$ and $R_{i+1,0}$, according to:

$$P_{x,y}=((32-w_y) \cdot R_{i,0}+w_y \cdot R_{i+1,0}+16)>>5$$

where $w_y$ is the weighting between the two reference samples corresponding to the projected subpixel location in between $R_{i,0}$ and $R_{i+1,0}$. Reference sample index i and weighting parameter $w_y$ are calculated based on the projection displacement d associated with the selected prediction direction (describing the tangent of the prediction direction in units of 1/32 samples and having a value from −32 to +32). $w_y$ and i are calculated according to:

$$c_y=(y \cdot d)>>5$$

$$w_y=(y \cdot d) \,\&\, 31$$

$$i=x+c_y$$

In JEM 6.0, the pixel sample $P_{x,y}$ is filtered from the four referenced pixels closest to where the direction points at, using a cubic 4-tap filter or a Gaussian 4-tap filter.

In version 6.0 of JEM, the block structure is quite different compared to HEVC. The block structure in JEM is referred to as quadtree plus binary tree block structure (QTBT) and is exemplified in FIG. 2. A coding unit in QTBT can have either square or rectangular shapes. A coding tree unit (CTU) is first partitioned by a quad tree structure. Then it is further partitioned either vertically or horizontally in a binary structure to form coding blocks, referred to as coding units (CUs). A block could thus have either a square or rectangular shape. The depth of the quad tree and binary tree can be set by the encoder in the bitstream.

Context Adaptive Binary Arithmetic Coding (CABAC) is an entropy-coding tool used in HEVC. CABAC encodes binary symbols, which keeps the complexity low and allows modelling of probabilities for more frequently used bits of a symbol. The probability models are selected adaptively based on local context, because coding modes usually are locally well correlated.

Bezier curves are parametric curves used to model smooth surfaces and are often used in computer graphics and animations. Bezier curves which can be scaled indefinitely may be linked together to create smooth paths that are intuitive and easy to modify. Bezier curves may be created using Castlejau's algorithm. In its general form, Bezier curves are expressed in terms of Bernstein polynomials. An often more useful way is to express the Bezier curve as a polynomial of the form:

$$B(t) = \sum_{j=0}^{n} t^j C_j \text{ where}$$

$$C_j = \frac{n!}{(n-j)!} \sum_{i=0}^{j} \frac{(-1)^{i+j} P_i}{i!(j-i)!} = \prod_{m=0}^{j-1}(n-m) \sum_{i=0}^{j} \frac{(-1)^{i+j} P_i}{i!(j-i)!}$$

and $P_i$ are the start, end, and control points, of the Bezier curve. A Bezier curve has the following important properties:

The curve begins at point $P_0$ and ends a point $P_n$.
The start (end) of the curve is tangent to the first (last) section of the Bezier polygon
A curve can be split at any point into two sub-curves
Every degree-n curve is also a degree-m curve for which m>n.

An example of constructing a quartic (degree n=4) Bezier curve (solid line) using five points $P_i$, i=0 . . . 4, is illustrated in FIG. 3, with t=0.25. $Q_i$, $R_i$, and $S_i$, are intermediate points used for constructing the curve.

A B-spline function is a piecewise polynomial function of degree k in a variable x. The places where the pieces meet are known as knots. The number of knots must be equal to, or greater than, k+1.

B-splines are considered as a generalization of Bezier curves with an important property, that any spline function of degree k on a given set of knots can be expressed as a linear combination of B-splines:

$$S_{k,t}(x) = \sum_{i} \alpha_i B_{i,k}(x)$$

The polynomial pieces of a B-spline curve are expressed as follows:

$$B_{i,1}(x) = \begin{cases} 1 & \text{if } t_i \leq x < t_{i+1} \\ 0 & \text{otherwise} \end{cases}$$

-continued $$B_{i,k}(x) = \frac{x - t_i}{t_{i+k-1} - t_i} B_{i,k-1}(x) + \frac{t_{i+k} - x}{t_{i+k} - t_{i+1}} B_{i+1,k-1}(x)$$

Curve fitting can be made with B-splines using a least-squared method with the following objective function:

$$U = \sum_{all\ x} \left\{ W(x) \left[ y(x) - \sum_{i} \alpha_i B_{i,k,t}(x) \right] \right\}^2$$

where $W(x)$ is a weight and $y(x)$ is the datum value at x. The coefficients $\alpha_i$ are the parameters to be determined.

SUMMARY

It is an object of the invention to provide an improved alternative to the above techniques and prior art.

More specifically, it is an object of the invention to provide an improved intra-prediction of picture blocks in video coding.

These and other objects of the invention are achieved by means of different aspects of the invention, as defined by the independent claims. Embodiments of the invention are characterized by the dependent claims.

According to a first aspect of the invention, a method of encoding a block of a picture into a video bitstream is provided. The method is performed by a video encoder and comprises encoding a first block of the picture, determining an intra-prediction mode for a second block of the picture, for which second block the intra-prediction is made from pixels in the first block along a non-straight line, encoding the second block using the determined intra-prediction mode, and signaling syntax elements for the second block in the video bitstream.

According to a second aspect of the invention, a method of decoding a block of a picture of a video bitstream is provided. The method is performed by a video decoder and comprises decoding a first block of the picture, parsing syntax elements for a second block of the picture from the video bitstream, determining an intra-prediction mode for the second block, for which second block the intra-prediction is made from pixels in the first block along a non-straight line, and decoding the second block using the determined intra-prediction mode.

According to a third aspect of the invention, a computer program is provided. The computer program comprises computer-executable instructions for causing a device to perform the method according to an embodiment of the first or second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

According to a fifth aspect of the invention, a video encoder for encoding a block of a picture into a video bitstream is provided. The video encoder comprises processing means and a memory comprising instructions which, when executed by the processing means, cause the video encoder to encode a first block of the picture, determine an intra-prediction mode for a second block of the picture, for which second block the intra-prediction is made from pixels in the first block along a non-straight line, encode the second block using the determined intra-prediction mode, and signal syntax elements for the second block in the video bitstream.

According to a sixth aspect of the invention, a video decoder for decoding a block of a picture of a video bitstream is provided. The video decoder comprises processing means and a memory comprising instructions which, when executed by the processing means, cause the video decoder to decode a first block of the picture, parse syntax elements for a second block of the picture from the video bitstream, determine an intra-prediction mode for the second block, for which second block the intra-prediction is made from pixels in the first block along a non-straight line, and decode the second block using the determined intra-prediction mode.

The intra-angular mode has been successfully used in HEVC as it provides a simple solution with good compression gains. In JEM, however, the number of directions has been doubled, resulting in an overall improvement of the prediction accuracy for an intra block. A problem with the intra-angular mode is that it can only predict blocks along a straight line. This may be an excellent prediction for some blocks, while it may be worse for blocks that do not have straight features in the texture, which are common in natural images.

The invention makes use of an understanding that a new intra-prediction mode, or a set of intra-prediction modes, is needed to improve intra-prediction for blocks that do not have straight features. In contrast to the angular mode in HEVC, which extends neighboring pixels only along a straight line, neighboring pixels are extended, or extrapolated, along a non-straight line. Thereby, an improved prediction for blocks in a video that have texture features which are not well represented by the DC mode, the planar mode, or the-intra angular mode, may be achieved. As a consequence of an improved intra-prediction, less bits are needed for residual coding, thereby improving the overall compression efficiency.

In some embodiments of the invention, the neighboring pixels are extended, here also referred to as predicted or extrapolated, along a curved line to better match blocks with curved features in the texture, which are common in natural images.

Even though advantages of the invention have in some cases been described with reference to embodiments of the first and/or second aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features, and advantages of the invention, will be better understood through the following illustrative and non-limiting detailed description of embodiments of the invention, with reference to the appended drawings, in which:

FIG. 15 illustrates the method of encoding a block of a picture into a video bitstream, in accordance with embodiments of the invention.

FIG. 16 illustrates a video encoder for encoding a block of a picture into a video bitstream, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1A:
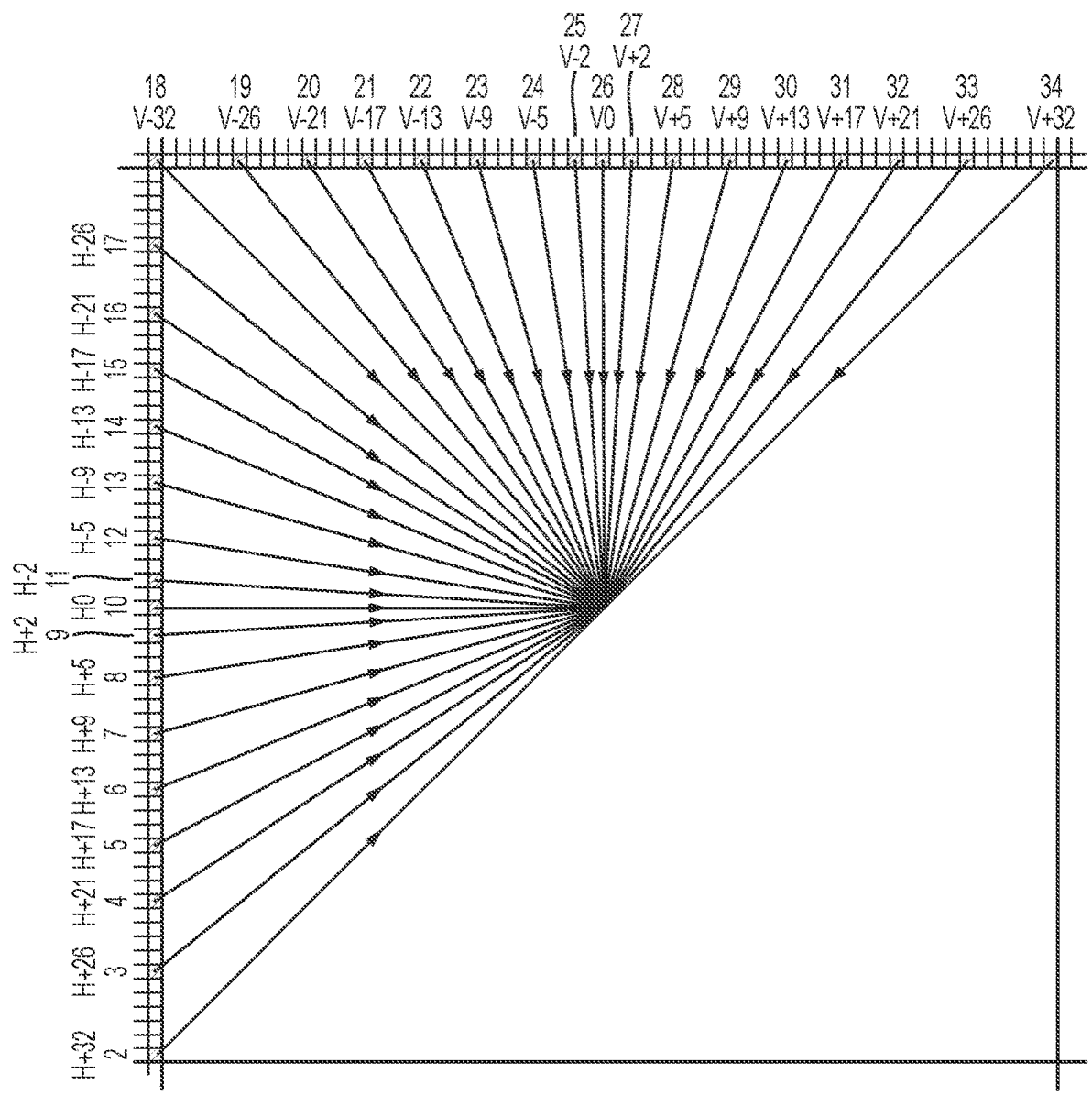
FIG. 1A illustrates possible angular modes in HEVC.
Figure 1B:
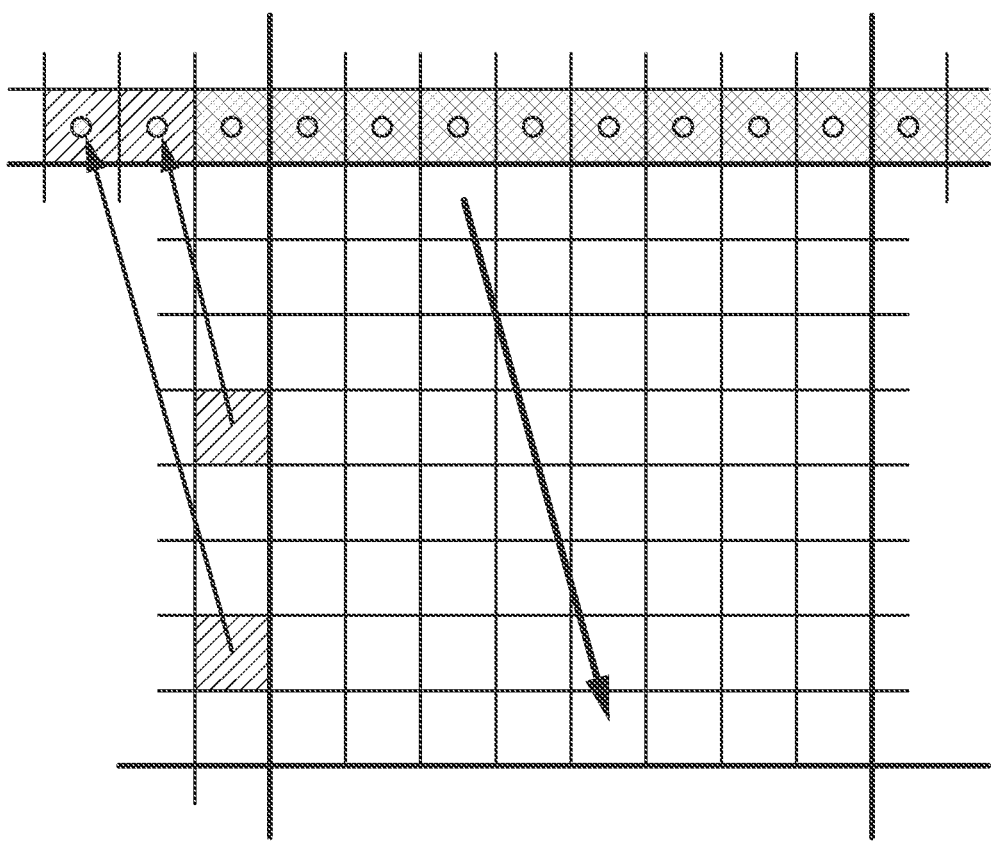
FIG. 1B illustrates an example of using an angular mode for intra-prediction in HEVC.
Figure 2:
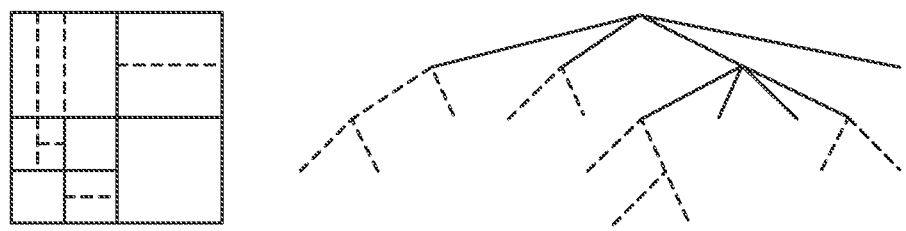
FIG. 2 illustrates an example of partitioning a CTU into CUs using QTBT.
Figure 3:
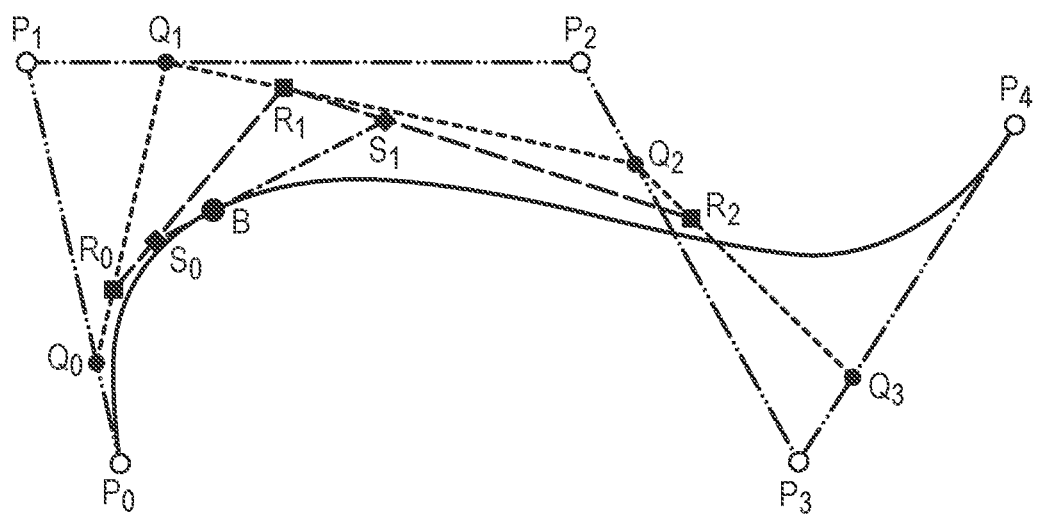
FIG. 3 illustrates an example of constructing a quartic (4-degree) Bezier curve.
Figure 4:
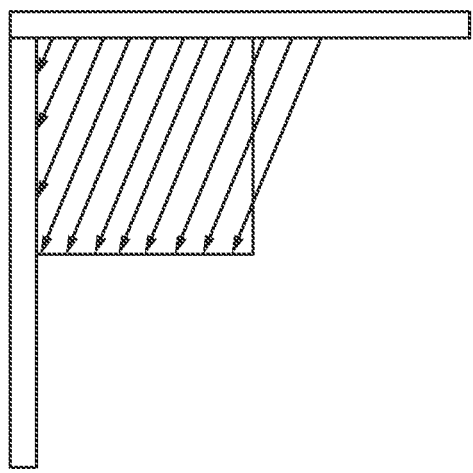
FIG. 4 illustrates an example of an angular intra-prediction mode of HEVC.

The basic concept of the invention is to build on the angular intra-prediction mode to not only extend the neighboring pixels along a straight line, as is the case for HEVC and illustrated in FIG. 4, but to extend the neighboring pixels along a non-straight line. This may be resembled with painting the current intra block using a non-straight brush stroke with paint from the neighboring blocks.

In the embodiments described below, the examples are described in terms of prediction from the top-neighboring block. The corresponding case, in which prediction is made from the left-neighboring block, is not always explicitly described below, it should be apparent for a person skilled in the art that it is possible to do the prediction both from the top- and from the left-neighboring blocks. It should also be apparent that it is possible to predict from more than one neighboring block at the same time, e.g., predicting the pixels for a block from both its above-neighboring block and its left-neighboring block.

Embodiment 1: Extending Neighboring Pixels Along a Non-Straight Line

As is described in the Background section, the angular intra-prediction mode in HEVC predicts the pixels for the current block from the (extended) top- or left-neighboring reference pixels by extending along a straight line in a specified direction, as is illustrated in FIG. 4.

In the first embodiment of the invention, the pixels of the current intra block are predicted from pixels in the neighboring blocks. The prediction is made by extending the pixels along a non-straight line, as is exemplified in FIGS. 5A and 5B.

Below are possible steps that may be performed by a video decoder according to the first embodiment of the invention:
1. Decode a first block of a picture in a video bitstream
2. Parse syntax elements for a second block of the picture in the video bitstream
3. Determine an intra-prediction mode for the second block, for which second block the prediction was made from pixels in the first block along a non-straight line
4. Decode the second block using the determined intra-prediction mode.

Below are possible steps that may correspondingly be performed by a video encoder according to the first embodiment of the invention:
1. Encode a first block of a picture
2. For a second block of the picture, select an intra-prediction mode for which prediction is made from pixels of the first block along a non-straight line
3. Predict the second block using the selected intra-prediction mode from pixels in the first block
4. Encode the second block into the video bitstream.

Embodiment 2: Signaling a Pre-Defined Curve

Figure 5A:
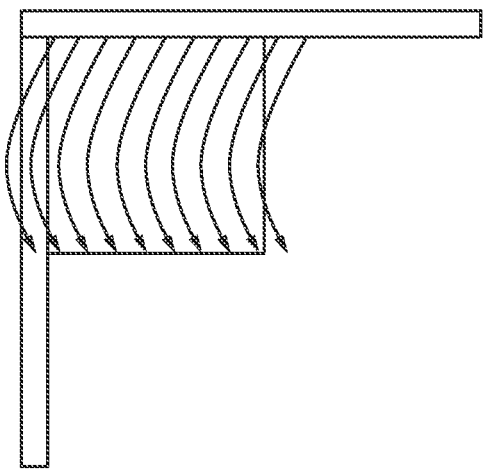
FIGS. 5A and 5B illustrate extending pixels from the top-neighboring block along a specified curve, in accordance with embodiments of the invention.
Figure 5B:
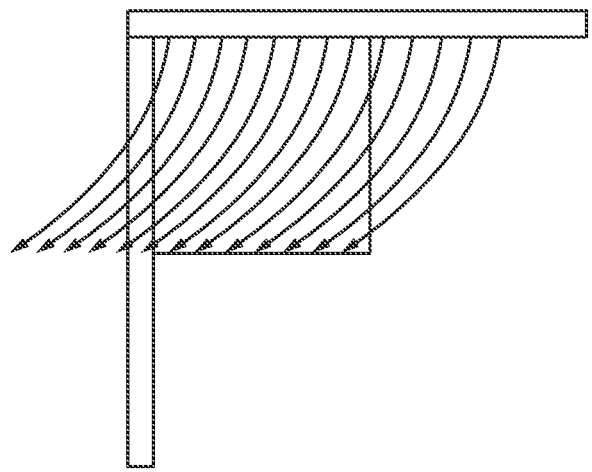

In the second embodiment of the invention, the pixels in the current block are predicted from pixels in the neighboring blocks along a specified, pre-defined curve. This is illustrated in FIGS. 5A and 5B, which show curves having opposite curvatures.

Figure 6:
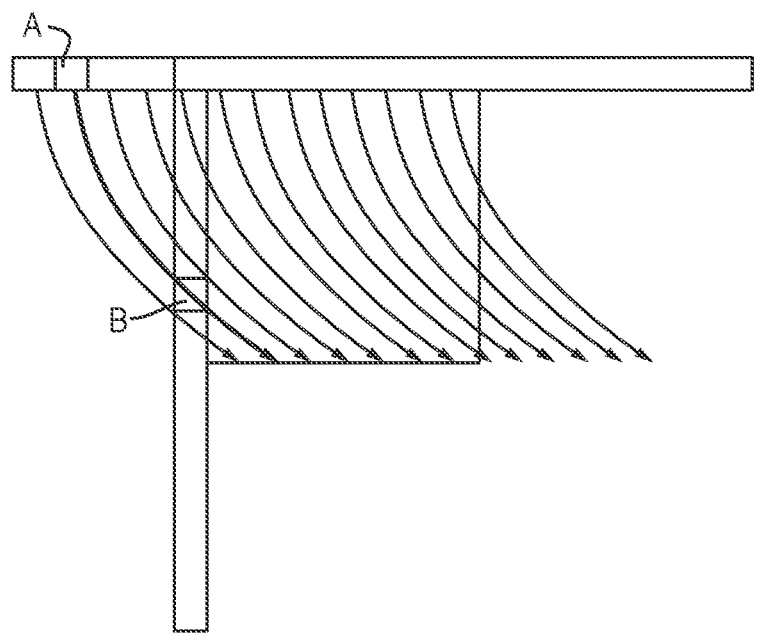
FIG. 6 illustrates intra-prediction, in accordance with embodiments of the invention.

In the case where pixels are extended from the top and the curve intersects the left reference column, as is illustrated in FIG. 6, the pixels in the top reference-row could be projected from the left reference-column (position A projected from position B in FIG. 6) similar to what is done for the angular mode in HEVC. Alternatively, the pixels could be extended from the left reference column directly (position B in FIG. 6).

In case the curve extends outside the reference area, e.g., to the right of the top reference area, the closest reference pixel may be used as reference for the pixels in the block that are on the curve. Alternatively, the set of available curves may be restricted to not include curves that extend outside the reference area.

Figure 7:
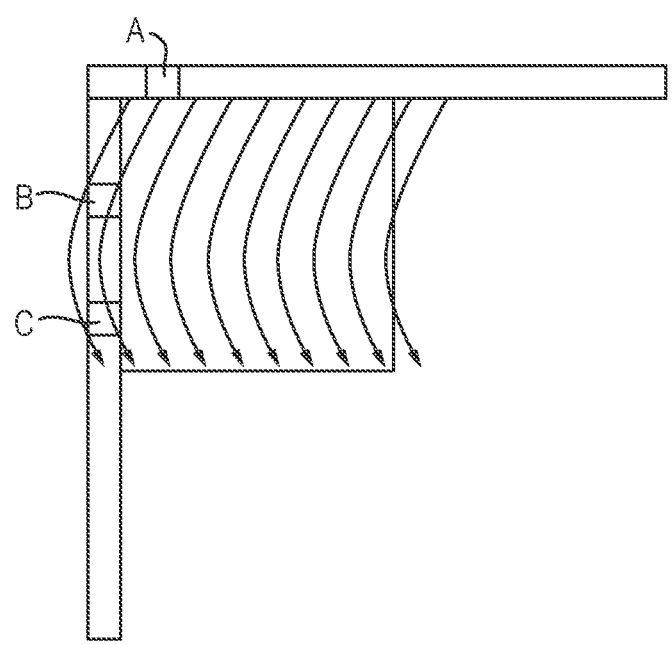
FIG. 7 illustrates intra-prediction, in accordance with other embodiments of the invention.

In the special case where the curve intersects the left reference column and back into the block, the first part of the curve can be interpolated between point A and point B as is illustrated in FIG. 7, and the remaining part of the curve can be extended from point C, or may alternatively be a weighted mix of the pixels in points A and C.

In one variation of the second embodiment, an angular mode is selected as a starting direction of the curve. The curve could be selected from a set of available curves. In its simplest form, the decoder applies one of the following curves: turn to the left, straight line, or turn to the right, i.e., the set of available curves equals {left turn, straight, right turn}.

A pixel p(x,y) in position (x,y) of the current block-to-predict could be derived like:

$$p(x,y)=r_{top}(x-d(x,y)+c(x,y),-1)$$

if the pixels are predicted from the reference pixels from the top, and $$p(x,y)=r_{left}(-1,y+d(x,y)+c(x,y))$$

if the pixels are predicted from the reference pixels from the left. In the equations above, "−1" indicates that the pixels are on the border reference row/column from the block-to-predict, and d(x,y) is the directional shift at position (x,y), equivalent to d·y+x used in HEVC, where d is the projection displacement. The directional shift d(x,y) is derived from the selected angular mode, and c(x,y) is the curve shift at position (x,y).

For a directional shift in which the pixels are derived from the top, the pixels are shifted as a linear function of y:

$$d(x,y)=c_1+c_2 \cdot y$$

where $c_1$ and $c_2$ are constants which are based on the selected direction.

The curve shift c(x,y) could be described in terms of increasing/decreasing pixel shifts for each row, for example:

$$c(x,y)=c_3+c_4 \cdot y^{c_5}$$

or $$c(x,y)=c_3+c_4 \cdot (2<<y)$$

or $$c(x,y)=c_3+c_4 \cdot 2^{c_5 \cdot y}$$

where $c_3$, $c_4$, and $c_5$, are constants.

Figure 8:
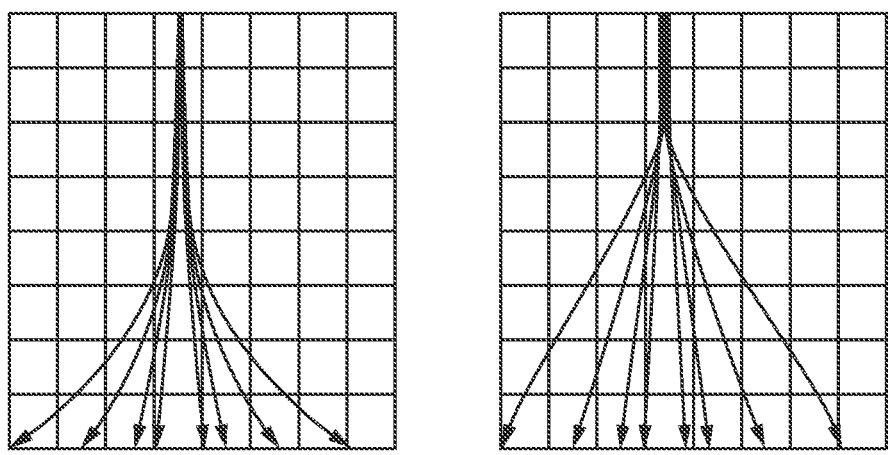
FIG. 8 exemplifies 16 different typical curves for an 8×8 block, in accordance with embodiments of the invention.
Figure 9:
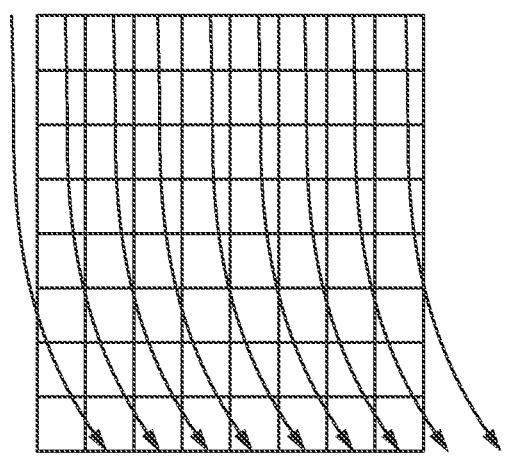
FIG. 9 illustrates intra-prediction for an 8×8 block using the 7th curve of FIG. 6, in accordance with embodiments of the invention.

The shape of the curves could also be defined explicitly and stored in a look-up table (LUT). This allows for more arbitrary shaped curves. Preferably, there should be a LUT for each possible block size. The input to each LUT could be a curve to use, e.g., an index, and the output could be the (possibly decimal) x-coordinates of the curve. As an example, FIG. 8 illustrates 16 typical curves for an 8×8 block that could be part of the set of available curves. Note that only one curve is finally selected for each encoded block. As an example, FIG. 9 illustrates an 8×8 block for which the 7th curve shown in FIG. 8 is used to intra-predict the block.

When the prediction is made from a position between two reference pixels, the pixels could be filtered to allow for subpixel precision. For instance, the pixels could be filtered using interpolation, as in HEVC, or the pixels could be filtered using a cubic 4-tap filter or a Gaussian 4-tap filter as used in JEM 6.0 for angular intra-prediction modes. The filtering may be done in the $r_{top}$ and $r_{left}$ functions described above, where the input coordinates may be decimal input.

The set of available curves may be different for different block sizes. For instance, a block of size 4×4 pixels could have a different set of available curves as compared to a block of size 32×32 pixels. Square blocks, e.g., 4×4, and rectangular blocks, e.g., 4×8, could also have different sets of available curves. The number of available curves could also be different depending on block size and shape. For instance, a 4×4 block could have five different curves to choose from, while a larger 16×16 block could have eleven different curves to choose from. For a given block, some of the normally available curves could be removed from the set of available curves due to missing neighboring blocks.

Whether to use an intra-prediction curved mode or not could be signaled in the bitstream with a flag on block level. Signaling of the flag could for instance be made using CABAC, or be bypass-coded. An example of syntax and semantics for signaling the curve flag and curve index in the bitstream is provided in Appendix A.

A flag could also be signaled in the slice header, in the Picture Parameter Set (PPS), or in the Sequence Parameter Set (SPS), to indicate if the curve mode is allowed for the current slice, current picture, or current sequence, respectively.

In one variation of the second embodiment, an index of the selected curve from the set of available curves is signaled in the bitstream. Signaling of the index could for instance be made using CABAC or some other kind of entropy coding, such as fixed length coding, unary coding, or Golomb coding.

In another variation of the second embodiment, the starting direction of the curve is included in the set of possible curves to use, i.e., the starting direction is not explicitly signaled in the bitstream, only an index to the curve to use.

In yet another variation of the second embodiment, the curve is derived from the neighboring blocks, either from the neighboring pixels directly, or from the intra-prediction modes used by the neighboring blocks. This is described in further detail below, in relation to Embodiment 5.

The maximum number of available curves for a block could be signaled on slice, picture, or sequence level, for instance in the slice header, in the picture PPS, or in the SPS.

Embodiment 3: Piece-Wise Line Construction

In some cases, predicting an intra block from its neighbors using a straight line is the best choice. In other cases, estimating the curvature in the texture of a block using a specific curve from a set of pre-defined curves may be a better choice, as is described in relation to Embodiment 2. Sometimes, however, the shape of the optimal non-straight line is not well aligned with a "normal-shaped" curve. In these cases, intra-prediction may be better if the non-straight line is explicitly coded.

One way of defining the shape of the non-straight line is to construct the line in a piece-wise manner. The line could for instance be divided into segments, where a vector describes the direction of each segment. The non-straight line could then be reconstructed from the segments using straight lines or some other kind of line segment construction method, such as Bezier curves, B-splines, or some other polynomial method. The vector parameters could be signaled in the bitstream using CABAC or some other kind of entropy coding, such as fixed length coding, unary coding, or Golomb coding.

Figure 10:
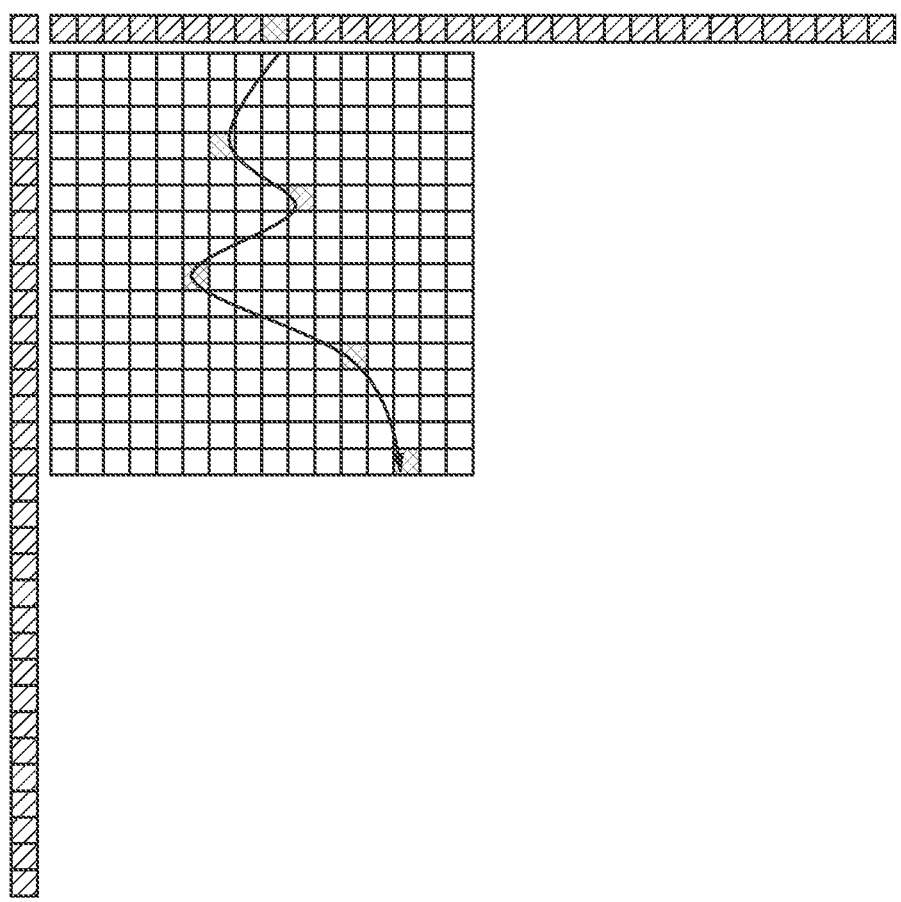
FIG. 10 shows an example of an arbitrarily-shaped line for a 16×16 block, in accordance with embodiments of the invention.

In FIG. 10, an example of an arbitrarily-shaped line is illustrated for a 16×16 block. The line has been divided into five segments, where each segment can be described with a vector. The vectors in the example, from the top, are: (−2,4), (3,2), (−4,3), (6,3), and (2,4). After signaling an indication that this mode is used, the number of segments N is signaled in the video bitstream, in this case N=5. Alternatively, an "end of vector" codeword could be signaled after the last vector. The x and y coordinates for the vectors would preferably be coded differently, since y cannot be negative. Alternatively, the coordinates could also be signaled with differential coding. The y of the last vector does not need to be signaled explicitly since it can be derived as the block height minus the sum of the y's in all previous vectors of the block.

Figure 11:
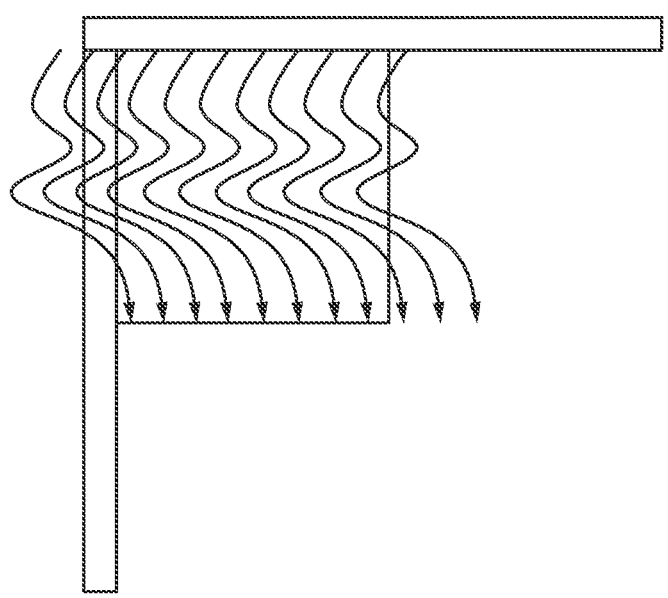
FIG. 11 illustrates extending the reference pixels from the top using the arbitrarily-shaped line of FIG. 10, in accordance with embodiments of the invention.

The same line would preferably be used for the whole block. FIG. 11 illustrates extending the reference pixels from the top to all pixels of the current block using the arbitrarily-shaped line of the example above. Note that a starting direction is not used, and thus not signaled in the third embodiment.

Figure 12:
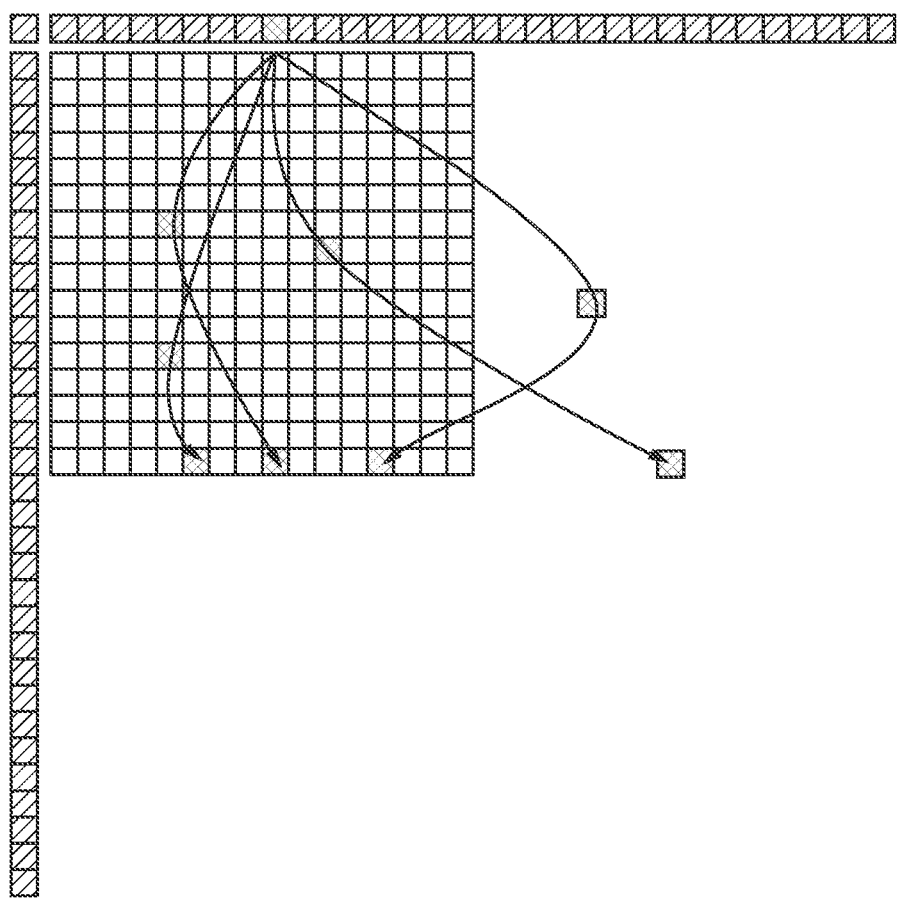
FIG. 12 exemplifies four different curves constructed from two pieces, in accordance with embodiments of the invention.

In a slightly simpler variation of the third embodiment, a fixed number N of segments is used, where N is not signaled on block level. Rather, N is either pre-defined or signaled in the bitstream at a higher level than the CU level, for instance at CTU-level, slice level, picture level, or sequence level. FIG. 12 exemplifies four different curves for N=2. The dots in the curve have been connected using a $2^{nd}$-order polynomial.

Even with only two segments, it is possible to represent numerous possible curves. With N=2, it is sufficient to code the ending x-position (of the second vector) and the x- and y-position where segments are joined (the "knee"). The ending x-position can be predicted from the angle of the neighboring block, either if an angular intra-prediction mode has been used for the neighboring block, or if a curved intra-prediction mode has been used in the neighboring block and the method described below in relation to Embodiment 5 is used. It may also be signaled similar to how the angular mode is signaled in HEVC or JEM, including using MPM selection. The knee position may be predicted as the midpoint between the starting point of the curve and the end point of the curve and could be derived as:

$$(x_{knee\_pred}, y_{knee\_pred}) = \left(\frac{x_{end}}{2}, \frac{height}{2}\right)$$

where "height" is the height of the block-to-be-predicted.

It is then sufficient to code the difference between the actual end-position and the predicted end-position, and the difference between the actual knee-position and the predicted knee position:

$$x_{end\_diff} = X_{end} - X_{end\_pred}$$

$$(X_{knee\_diff}, y_{knee\_diff}) = (x_{knee} - x_{knee\_pred}, y_{knee} - y_{knee\_pred})$$

In the example illustrated in FIG. 10, where the left-most curve is Curve 1 and the right-most curve is Curve 4, the differences for the knee positions are derived as illustrated in the following table, which exemplifies coded integer differences for knee positions:

| Curve | End position x | Knee position (x, y) | Predicted knee position based on height and end position x | Coded integer difference for knee position |
|---|---|---|---|---|
| 1 | −3 | (12, −4) | (8, −1.5) | (4, −2) |
| 2 | 0 | (7, −4) | (8, 0) | (−1, −4) |
| 3 | 4 | (10, 12) | (8, 2) | (2, 10) |
| 4 | 15 | (8, 2) | (8, 7.5) | (0, 6) |

The differences could for instance be entropy-coded using CABAC, fixed length coding, unary coding, or Golomb coding. The precision used when encoding the differences could depend on the block size, such that smaller blocks would have higher precision (for instance subpixel precision), while larger blocks have a sparser precision of the difference. In addition, the precision may be quantized based on a quality control mechanism, e.g., by using the existing QP parameter. In this way, the precision of the curve can be set in line with the desired balance between quality and bitrate.

In an alternative variation of the third embodiment the derivation of the end position and the knee position are reversed. In this case, the prediction for the knee position is derived from the neighboring block or signaled similar to the angular mode of HEVC, and the end position x is derived from the knee position.

Figure 13:
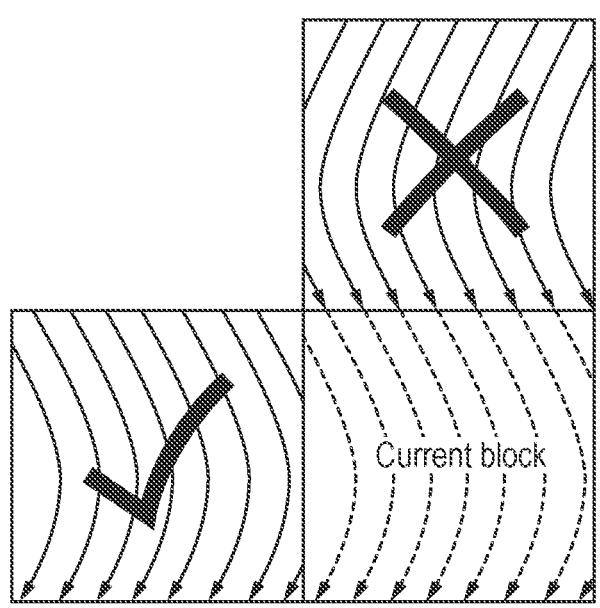
FIG. 13 illustrates deriving the intra-prediction mode from modes of neighboring blocks, in accordance with embodiments of the invention.

Embodiment 4: Deriving the Intra-Prediction Mode from Modes of Neighboring Blocks In HEVC and JEM, the intra-prediction mode is primarily selected from an MPM list including candidate modes used by the neighboring blocks. This is advantageous when the modes used by the neighboring blocks are angular modes, and the texture would continue in the same straight direction between blocks. However, for embodiments of the invention, which are based on using non-straight lines for intra-prediction, it is unlikely that the same intra-prediction mode, or curve, as that used for a neighboring block from which pixels are extended, would result in a satisfactory intra-prediction. For instance, as is illustrated in FIG. 13, if the pixels are extended from the top, and the intra-prediction mode of the top-neighboring block is a curved mode, that curved mode (or its starting direction) would likely not be a good choice for the current block. On the other hand, if the pixels are extended from the top, and the intra-prediction mode of the left neighboring block is a curved mode, that curved mode would more likely result in a satisfactory intra-prediction also for the current block.

Instead of including the curved mode of the neighboring block, from which the pixels are extended (the mode of the above neighbor in the example above) in the MPM list, a mode that would continue the direction of the curve is included in the list. This mode could be a straight intra-prediction angular mode or a curved mode that continues the curve from the (above) neighboring block. The neighboring block for which the pixel prediction is not made could still be used to predict the curve mode, as is illustrated in FIG. 13. The direction of the mode to use for the MPM could either be derived from the bottom part of the curve of the (above) neighboring block or be taken from a LUT, where the entry of the LUT is the curve mode (including its starting angle) of the block to predict from and the output of the LUT is the mode to use.

Embodiment 5: Extrapolating Pixels from Neighboring Blocks

In the fifth embodiment, pixels from more than one layer of rows or columns of the neighboring blocks are used for the intra-prediction. The pixels could be extended by extrapolating from the neighboring pixels along the non-straight line such that the predicted pixels along the line depend on pixels from more than one row/column.

Figure 14:
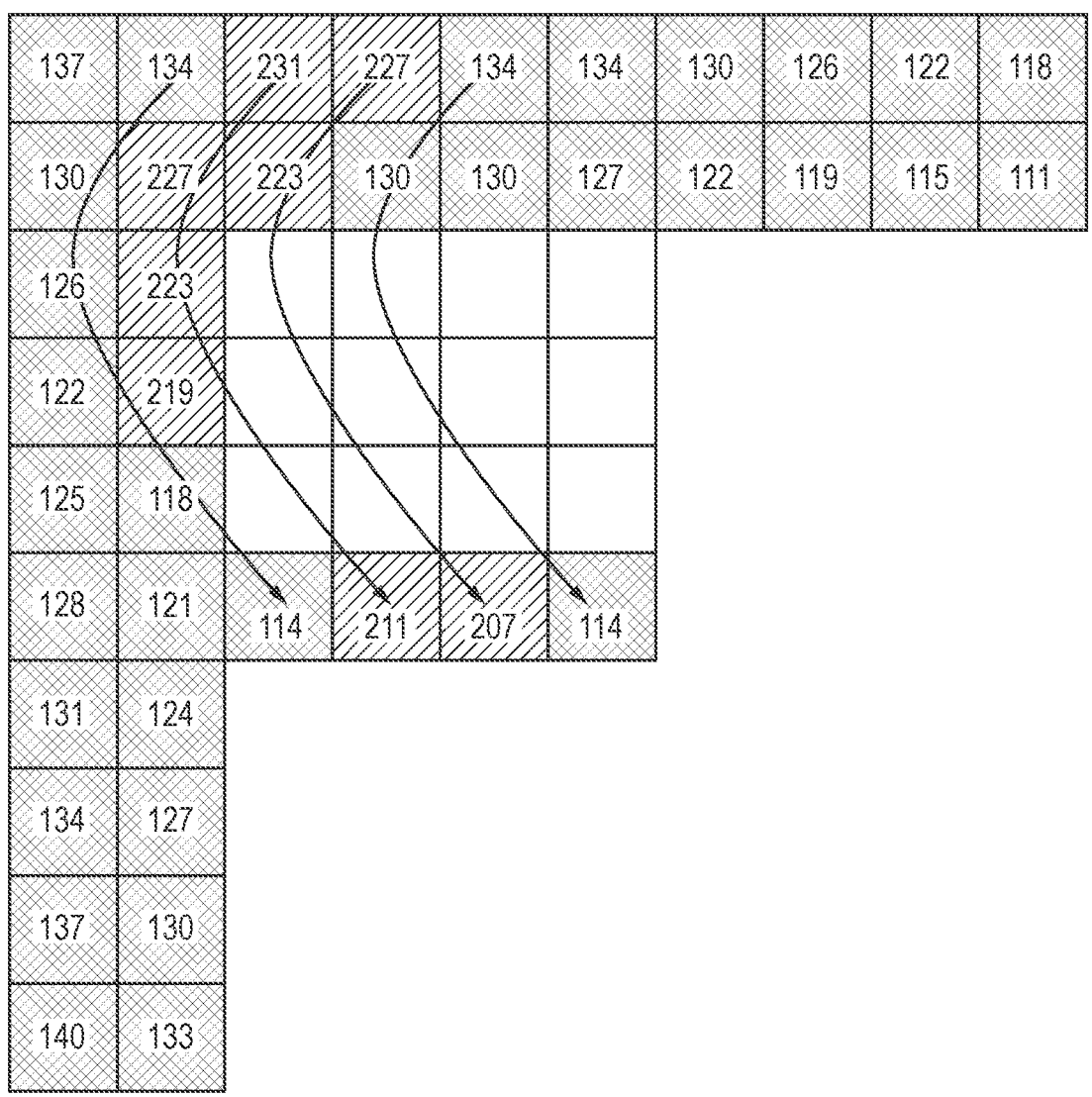
FIG. 14 illustrates extrapolating pixels in the current block from a reference area comprising two or more rows or columns, in accordance with embodiments of the invention.

An example of this is illustrated in FIG. 14, in which the bottom row of the current block has been extrapolated from the top from two layers of reference pixels from the above neighboring blocks along a non-straight line. In the example, full-pixel precision without filtering has been used when calculating the extrapolation. When the non-straight curve starts between two reference pixels, subpixel filtering should preferably be applied.

Embodiments of the invention may be applied to the luma component and/or the chroma component of pixels in a picture. The intra-prediction mode to be used for chroma component may also be derived from the intra-prediction mode that was selected for the luma component.

In FIG. 15, embodiments of the method 1500 of encoding a block of a picture into a video bitstream are illustrated.

Method 1500 is performed by a video encoder and comprises encoding 1510 a first block of the picture, determining 1520 an intra-prediction mode for a second block of the picture, for which second block the intra-prediction is made from pixels in the first block along a non-straight line, encoding 1530 the second block using the determined intra-prediction mode, and signaling 1540 syntax elements for the second block in the video bitstream.

For instance, the non-straight line may be a pre-defined curve which is selected from a set of available curves. Optionally, an angular mode is selected as a starting direction of the curve.

Alternatively, the non-straight line may be an explicitly defined curve which is stored in a look-up table.

As another alternative, the non-straight line may comprise at least two segments, each segment having a respective direction which is described by a vector.

It will be appreciated that method 1500 may comprise additional, or modified, steps in accordance with what is described throughout this disclosure. An embodiment of method 1500 may be implemented as software, such as computer program 1930, to be executed by a processing unit comprised in a video encoder, such as processor 1910 comprised in video encoder 1900 illustrated in FIG. 19, whereby video encoder 1900 becomes operative in accordance with embodiments of the invention described herein.

In FIG. 16, embodiments of the video encoder 1600 for encoding a block of a picture into a video bitstream are illustrated. Video encoder 1600 comprises an encoding module 1610 configured to encode a first block of the picture and to encode the second block of the picture using a determined intra-prediction mode, a determining module 1620 configured to determine the intra-prediction mode for the second block of the picture, for which second block the intra-prediction is made from pixels in the first block along a non-straight line, and a signaling module 1630 configured to signal syntax elements for the second block in the video bitstream.

For instance, the non-straight line may be a pre-defined curve which is selected from a set of available curves. Optionally, an angular mode may be selected as a starting direction of the curve.

As an alternative, the non-straight line may be explicitly defined curve which is stored in a look-up table.

As another alternative, the non-straight line may comprise at least two segments, each segment having a respective direction described by a vector.

Embodiments of video encoder 1600 may be implemented in hardware, in software, or a combination of hardware and software. Video encoder may, e.g., comprised in a User Equipment (UE), such as a mobile telephone, a tablet, a desktop computer, a netbook, a multimedia player, a video streaming server, a set-top box, or a computer.

Figure 17:
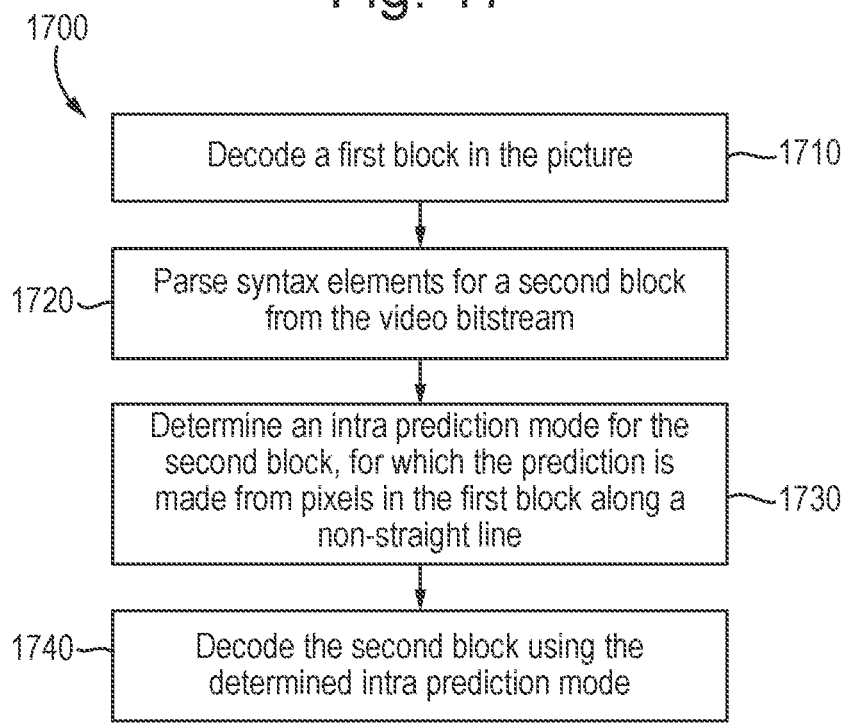
FIG. 17 illustrates the method of decoding a block of a picture of a video bitstream, in accordance with embodiments of the invention.

In FIG. 17, embodiments of the method 1700 of decoding a block of a picture of a video bitstream are illustrated. Method 1700 is performed by a video decoder and comprises decoding 1710 a first block of the picture, parsing 1720 syntax elements for a second block of the picture from the video bitstream, determining 1730 an intra-prediction mode for the second block, for which second block the intra-prediction is made from pixels in the first block along a non-straight line, and decoding 1740 the second block using the determined intra-prediction mode.

For instance, the non-straight line may be a pre-defined curve which is selected from a set of available curves. Optionally, an angular mode is selected as a starting direction of the curve.

Alternatively, the non-straight line may be an explicitly defined curve which is stored in a look-up table.

As another alternative, the non-straight line may comprise at least two segments, each segment having a respective direction which is described by a vector.

It will be appreciated that method 1700 may comprise additional, or modified, steps in accordance with what is described throughout this disclosure. An embodiment of method 1700 may be implemented as software, such as computer program 1930, to be executed by a processing unit comprised in a video decoder, such as processor 1910 comprised in video decoder 1900 illustrated in FIG. 19, whereby video decoder 1900 becomes operative in accordance with embodiments of the invention described herein.

Figure 18:
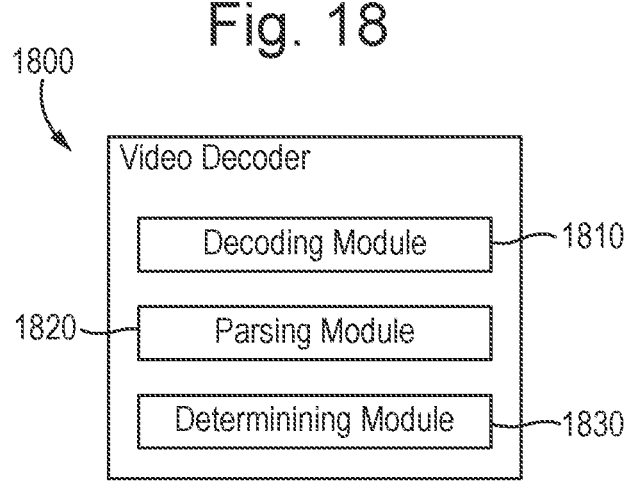
FIG. 18 illustrates a video decoder for decoding a block of a picture of a video bitstream, in accordance with embodiments of the invention.

In FIG. 18, embodiments of the video decoder 1800 for decoding a block of a picture of a video bitstream are illustrated. Video decoder 1800 comprises a decoding module 1810 configured to decode a first block of the picture and to decode a second block of the picture using a determined intra-prediction mode, a parsing module 1820 configured to parse syntax elements for the second block from the video bitstream, and a determining module 1830 configured to determine the intra-prediction mode for the second block, for which second block the intra-prediction is made from pixels in the first block along a non-straight line.

For instance, the non-straight line may be a pre-defined curve which is selected from a set of available curves. Optionally, an angular mode is selected as a starting direction of the curve.

Alternatively, the non-straight line may be an explicitly defined curve which is stored in a look-up table.

As another alternative, the non-straight line may comprise at least two segments, each segment having a respective direction which is described by a vector.

Embodiments of video decoder 1800 may be implemented in hardware, in software, or a combination of hardware and software. Video encoder may, e.g., comprised in a UE, such as a mobile telephone, a tablet, a desktop computer, a netbook, a multimedia player, a video streaming server, a set-top box, or a computer.

Figure 19:
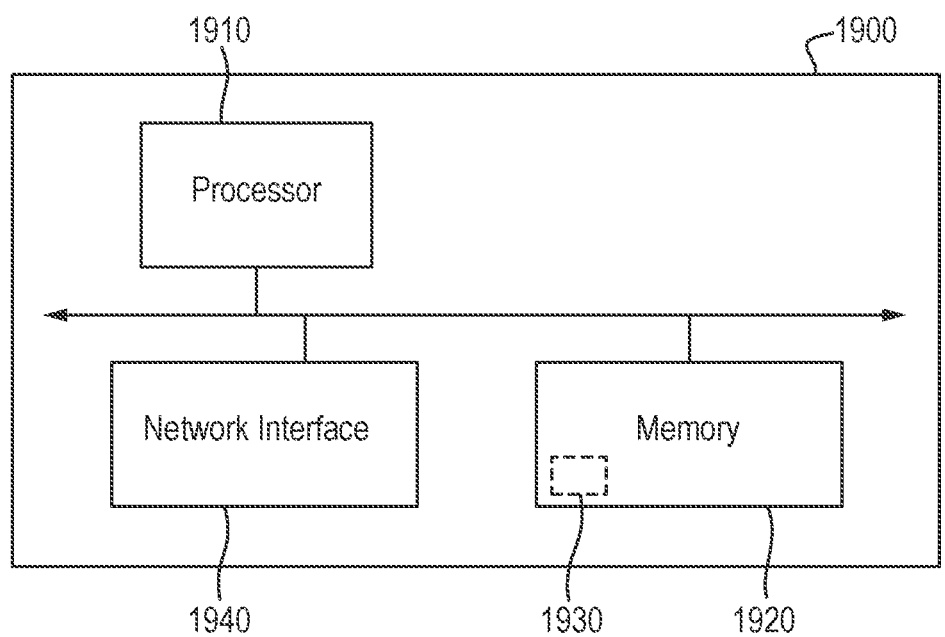
FIG. 19 illustrates a video encoder/decoder, in accordance with other embodiments of the invention.

In FIG. 19, alternative embodiments of a video encoder 1900 for encoding a block of a picture into a video bitstream, or a video decoder 1900 for decoding a block of a picture of a video bitstream, are illustrated. Video encoder 1900 comprises processing means 1910, such as a processor or processing circuitry, and a memory 1920, such as a Random-Access Memory (RAM), a Read-Only Memory (ROM), a Flash memory, a hard-disk drive, or the like. Memory 1920 comprises instructions 1930 which, when executed by processing means 1910, cause video encoder 1900 to encode a first block of the picture, determine an intra-prediction mode for a second block of the picture, for which second block the intra-prediction is made from pixels in the first block along a non-straight line, encode the second block using the determined intra-prediction mode, and signal syntax elements for the second block in the video bitstream.

For instance, the non-straight line may be a pre-defined curve which is selected from a set of available curves. Optionally, an angular mode is selected as a starting direction of the curve.

Alternatively, the non-straight line may be an explicitly defined curve which is stored in a look-up table.

As another alternative, the non-straight line may comprise at least two segments, each segment having a respective direction which is described by a vector.

Alternatively, instructions 1930 may, when executed by processing means 1910, cause video decoder 1900 to decode a first block of the picture, parse syntax elements for a second block of the picture from the video bitstream, determine an intra-prediction mode for the second block, for which second block the intra-prediction is made from pixels in the first block along a non-straight line, and decode the second block using the determined intra-prediction mode. Video decoder 1900 further comprises a network interface 1940 for transmitting or receiving the video bitstream over a communications network.

For instance, the non-straight line may be a pre-defined curve which is selected from a set of available curves. Optionally, an angular mode is selected as a starting direction of the curve.

Alternatively, the non-straight line may be an explicitly defined curve which is stored in a look-up table.

As another alternative, the non-straight line may comprise at least two segments, each segment having a respective direction which is described by a vector.

Encoding module 1610, determining module 1620, signaling module 1630, decoding module 1810, parsing module 1820, determining module 1830, and network interface 1940, may be implemented by any kind of electronic circuitry, e.g., any one, or a combination of, analogue electronic circuitry, digital electronic circuitry, and processing means executing a suitable computer program, i.e., software.

The person skilled in the art realizes that the invention by no means is limited to the embodiments described above. On the contrary, many modifications and variations are possible within the scope of the appended claims.

Appendix A: Example of syntax and semantics for signaling curve flag and curve index In this Appendix, an example of syntax and semantics for signaling a curve flag and a curve index is provided. Changes to the syntax and semantics are indicated relative to ITU-T Recommendation H.265, SERIES H: AUDIOVISUAL AND MULTIMEDIA SYSTEMS, "High efficiency video coding", 12/2016. Changes to the syntax are marked by a frame, and changes to the semantics are marked <u>underlined</u>.

7.3.8.5 Coding unit syntax

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( palette_mode_enabled_flag && CuPredMode[ x0 ][ y0 ] == MODE_INTRA && log2CbSize <= MaxTbLog2SizeY ) | |
|       palette_mode_flag[ x0 ][ y0 ] | ae(v) |
|     if( palette_mode_flag[ x0 ][ y0 ] ) | |
|       palette_coding( x0, y0, nCbS ) | |
|     else { | |
|       if( CuPredMode[ x0 ][ y0 ] != MODE_INTRA \|\| log2CbSize == MinCbLog2SizeY ) | |
|         part_mode | ae(v) |
|       if( CuPredMode[ x0 ][ y0 ] == MODE_INTRA ) { | |
|         if( PartMode == PART_2Nx2N && pcm_enabled_flag && log2CbSize >= Log2MinIpcmCbSizeY && log2CbSize <= Log2MaxIpcmCbSizeY ) | |
|           pcm_flag[ x0 ][ y0 ] | ae(v) |
|         if( pcm_flag[ x0 ][ y0 ] ) { | |
|           while( !byte_aligned( ) ) | |
|             pcm_alignment_zero_bit | f(1) |
|           pcm_sample( x0, y0, log2CbSize ) | |

| | |
|---|---|
| } else { | |
| pbOffset = ( PartMode == PART_NxN ) ? ( nCbS / 2 ) : nCbS | |
| for( j = 0; j < nCbS; j = j + pbOffset ) | |
| for( i = 0; i < nCbS; i = i + pbOffset ) | |
| prev_intra_luma_pred_flag[ x0 + i ][ y0 + j ] | ae(v) |
| for( j = 0; j < nCbS; j = j + pbOffset ) | |
| for( i = 0; i < nCbS; i = i + pbOffset ) | |
| if( prev_intra_luma_pred_flag[ x0 + i ][ y0 + j ] ) | |
| mpm_idx[ x0 + i ][ y0 + j ] | ae(v) |
| else | |
| rem_intra_luma_pred_mode[ x0 + i ][ y0 + j ] | ae(v) |
| for( j = 0; j < nCbS; j = j + pbOffset ) | |
| for( i = 0; i < nCbS; i = i + pbOffset ) { | |
| intra_luma_curve_pred_flag[ x0 + i ][ y0 + j ] | ae(v) |
| if( intra_luma_curve_pred_flag[ x0 + i ][ y0 + j ] ) | |
| intra_luma_curve_pred_idx[ x0 + i ][ y0 + j ] | ae(v) |
| } | |
| if( ChromaArrayType == 3 ) | |
| for( j = 0; j < nCbS; j = j + pbOffset ) | |
| for( i = 0; i < nCbS; i = i + pbOffset ) | |
| intra_chroma_pred_mode[ x0 + i ][ y0 + j ] | ae(v) |
| else if( ChromaArrayType != 0 ) | |
| intra_chroma_pred_mode[ x0 ][ y0 ] | ae(v) |
| } | |
| } else { | |
| if( PartMode == PART_2Nx2N ) | |
| prediction_unit( x0, y0, nCbS, nCbS ) | |
| else if( PartMode == PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode == PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else if( PartMode == PART_2NxnU ) { | |
| prediction_unit( x0, y0, nCbS, nCbS / 4 ) | |
| prediction_unit( x0, y0 + ( nCbS / 4 ), nCbS, nCbS * 3 / 4 ) | |
| } else if( PartMode == PART_2NxnD ) { | |
| prediction_unit( x0, y0, nCbS, nCbS * 3 / 4 ) | |
| prediction_unit( x0, y0 + ( nCbS * 3 / 4 ), nCbS, nCbS / 4 ) | |
| } else if( PartMode == PART_nLx2N ) { | |
| prediction_unit( x0, y0, nCbS / 4, nCbS ) | |

| | |
|---|---|
| prediction_unit( x0 + ( nCbS / 4 ), y0, nCbS * 3 / 4, nCbS ) | |
| } else if( PartMode == PART_nRx2N ) { | |
| prediction_unit( x0, y0, nCbS * 3 / 4, nCbS ) | |
| prediction_unit( x0 + ( nCbS * 3 / 4 ), y0, nCbS / 4, nCbS ) | |
| } else { /* PART_NxN */ | |
| prediction_unit( x0, y0, nCbS / 2, nCbS / 2 ) | |
| prediction_unit( x0 + ( nCbS / 2 ), y0, nCbS / 2, nCbS / 2 ) | |
| prediction_unit( x0, y0 + ( nCbS / 2 ), nCbS / 2, nCbS / 2 ) | |
| prediction_unit( x0 + ( nCbS / 2 ), y0 + ( nCbS / 2 ), nCbS / 2, nCbS / 2 ) | |
| } | |
| } | |
| if( !pcm_flag[ x0 ][ y0 ] ) { | |
| if( CuPredMode[ x0 ][ y0 ] != MODE_INTRA &&<br>!( PartMode == PART_2Nx2N && merge_flag[ x0 ][ y0 ] ) ) | |
| rqt_root_cbf | ae(v) |
| if( rqt_root_cbf ) { | |
| MaxTrafoDepth = ( CuPredMode[ x0 ][ y0 ] == MODE_INTRA ?<br>( max_transform_hierarchy_depth_intra + IntraSplitFlag ) :<br>max_transform_hierarchy_depth_inter ) | |
| transform_tree( x0, y0, x0, y0, log2CbSize, 0, 0 ) | |
| } | |
| } | |
| } | |
| } | |
| } | |

7.4.9.5 Coding unit semantics

...
The syntax elements prev_intra_luma_pred_flag[ x0 + i ][ y0 + j ], mpm_idx[ x0 + i ][ y0 + j ], rem_intra_luma_pred_mode[ x0 + i ][ y0 + j ], <u>intra_luma_curve_pred_flag[ x0 + i ][ y0 + j ] and intra_luma_curve_pred_idx[ x0 + i ][ y0 + j ]</u> specify the intra prediction mode for luma samples. The array indices x0 + i, y0 + j specify the location ( x0 + i, y0 + j ) of the top-left luma sample of the considered prediction block relative to the top-left luma sample of the picture. When prev_intra_luma_pred_flag[ x0 + i ][ y0 + j ] is equal to 1, the intra prediction mode is inferred from a neighbouring intra-predicted prediction unit according to clause Error! Reference source not found.. <u>When intra_luma_curve_pred_flag[ x0 + i ][ y0 + j ] is equal to 1, the intra prediction mode is inferred from intra_luma_curve_pred_idx[ x0 + i ][ y0 + j ] according to clause 8.4.2.</u>
...

8.4.4.2.6 Specification of intra prediction mode in the range of INTRA_ANGULAR2.. INTRA_ANGULAR34

...

Table Error! No text of specified style in document.-1 further specifies the mapping table between predModeIntra and the inverse angle parameter invAngle.

Table Error! No text of specified style in document.-1 – Specification of invAngle

| predModeIntra | 11 | 12 | 13 | 14 | 15 | 16 | 17 | 18 |
|---|---|---|---|---|---|---|---|---|
| invAngle | −4 096 | −1 638 | −910 | −630 | −482 | −390 | −315 | −256 |
| predModeIntra | 19 | 20 | 21 | 22 | 23 | 24 | 25 | 26 |
| invAngle | −315 | −390 | −482 | −630 | −910 | −1 638 | −4 096 | - |

Table Error! No text of specified style in document.-17 further specifies the mapping table between predCurveIntra and the intraPredCurveShift.

Table 8-7 Specification of intraPredCurveShift for MxN blocks

| predCurveIntra index | -1 | 0 | 1 | 3 | ... |
|---|---|---|---|---|---|
| intraPredCurveShift[ 0 ] | 0 | | | | |
| intraPredCurveShift[ 1 ] | 0 | | | | |
| intraPredCurveShift[ ... ] | 0 | | | | |
| intraPredCurveShift[ N-1 ] | 0 | | | | |

Note 2: A table should be provided in the specification for each of the possible MxN blocks that supports the intra curve mode. Values should be furthermore be provided for each cell of the tables.

The variable disableIntraBoundaryFilter is derived as follows:

– If intra_boundary_filtering_disabled_flag is equal to 1, disableIntraBoundaryFilter is set equal to 1.

– Otherwise (intra_boundary_filtering_disabled_flag is equal to 0), if implicit_rdpcm_enabled_flag and cu_transquant_bypass_flag are both equal to 1, disableIntraBoundaryFilter is set equal to 1.

– Otherwise, disableIntraBoundaryFilter is set equal to 0.

The values of the prediction samples predSamples[ x ][ y ], with x, y = 0..nTbS − 1 are derived as follows:

– If predModeIntra is greater than or equal to 18, the following ordered steps apply:

1. The reference sample array ref[ x ] is specified as follows:

– The following applies:

ref[ x ] = p[ −1 + x ][ −1 ], with x = 0..nTbS(Error! No text of specified style in document.-1)

— If intraPredAngle is less than 0, the main reference sample array is extended as follows:

— When ( nTbS * intraPredAngle ) >> 5 is less than −1, ref[ x ] = p[ −1 ][ −1 + ( ( x * invAngle + 128 ) >> 8 ) ], with x = −1..( nTbS * intraPredAngle ) >> 5(Error! No text of specified style in document.-2)

— Otherwise, ref[ x ] = p[ −1 + x ][ −1 ], with x = nTbS + 1..2 * nTbS(Error! No text of specified style in document.-3)

2. The values of the prediction samples predSamples[ x ][ y ], with x, y = 0..nTbS − 1 are derived as follows:

a. The index variable iIdx and the multiplication factor iFact are derived as follows:

iIdx = ( ( y + 1 ) * (intraPredAngle + intraPredCurveShift[ y ])) >> 5 (Error! No text of specified style in document.-4)

iFact = ( ( y + 1 ) * (intraPredAngle + intraPredCurveShift[ y ])) & 31(Error! No text of specified style in document.-5)

...

1. The values of the prediction samples predSamples[ x ][ y ], with x, y = 0..nTbS − 1 are derived as follows:

a. The index variable iIdx and the multiplication factor iFact are derived as follows:

iIdx = ( ( x + 1 ) * (intraPredAngle + intraPredCurveShift[ y ]) ) >> 5(Error! No text of specified style in document.-6)

iFact = ( ( x + 1 ) * (intraPredAngle + intraPredCurveShift[ y ]) ) & 31(Error! No text of specified style in document.-7)

...

The invention claimed is:

1. A method of encoding a block of a picture into a video bitstream, the method being performed by a video encoder and comprising:
    encoding a first block of the picture;
    determining an intra-prediction mode for a second block of the picture, for which second block the intra-prediction is made from pixels in the first block along a non-straight line created using an available curve that is selected from a set of available curves that are based on a block size of the first block, wherein the set of available curves is different for different block sizes;
    encoding the second block using the determined intra-prediction mode; and
    signaling syntax elements for the second block in the video bitstream wherein the syntax elements indicate the available curve selected from the set of available curves.

2. The method according to claim 1, further comprising:
    selecting the set of available curves from a plurality of sets of available curves based on the block size of the first block, wherein different ones of the plurality of the sets of available curves are based on different block sizes of the first block.

3. The method according to claim 2, further comprising selecting an angular mode as a starting direction of the non-straight line.

4. The method according to claim 1, wherein the non-straight line is an explicitly defined curve stored in a look-up table.

5. A computer program comprising computer-executable instructions for causing a device to perform the method according to claim 1, when the computer-executable instructions are executed on a processing unit comprised in the device.

6. The method of claim 1 wherein a number of available curves in a set of available curves is based on the size of the block.

7. The method of claim 6 wherein the number of available curves in the set of available curves is further based on a shape of the block.

8. The method of claim 6 further comprising removing at least one available curve in the set of available curves responsive to a missing neighboring block.

9. A method of decoding a block of a picture of a video bitstream, the method being performed by a video decoder and comprising:
    decoding a first block of the picture;
    parsing syntax elements for a second block of the picture from the video bitstream to determine a curve to use to create a non-straight line, the curve from a set of available curves that are based on a block size of the first block, wherein the set of available curves is different for different block sizes;
    determining an intra-prediction mode for the second block, for which second block the intra-prediction is made from pixels in the first block along the non-straight line that is created based on the curve determined to use; and
    decoding the second block using the determined intra-prediction mode.

10. The method according to claim 9, further comprising determining the set of available curves from a plurality of sets of available curves based on the block size of the first block, wherein different ones of the plurality of the sets of available curves are based on different block sizes of the first block.

11. The method according to claim 10, further comprising selecting an angular mode as a starting direction of the non-straight line.

12. The method according to claim 9, wherein the non-straight line is an explicitly defined curve stored in a look-up table.

13. A video encoder for encoding a block of a picture into a video bitstream, the video encoder comprising processing circuitry and a memory comprising instructions which, when executed by the processing circuitry, cause the video encoder to:
    encode a first block of the picture;
    determine an intra-prediction mode for a second block of the picture, for which second block the intra-prediction is made from pixels in the first block along a non-straight line created using an available curve that is selected from a set of available curves based on a block size of the first block, wherein the set of available curves is different for different block sizes;
    encode the second block using the determined intra-prediction mode; and
    signal syntax elements for the second block in the video bitstream wherein the syntax elements indicate the available curve selected from the set of available curves.

14. The video encoder according to claim 13, wherein the memory comprises further instructions which, when executed by the processing circuitry, cause the video encoder to:
    select the set of available curves from a plurality of sets of available curves based on the block size of the first block, wherein different ones of the plurality of the sets of available curves are based on different block sizes of the first block.

15. The video encoder according to claim 14, wherein the memory comprises further instructions which, when executed by the processing circuitry, cause the video encoder to select an angular mode as a starting direction of the non-straight line.

16. The video encoder according to claim 13, wherein the non-straight line is an explicitly defined curve stored in a look-up table.

17. The video encoder according to claim 13, comprised in any one of a User Equipment, UE, a mobile telephone, a tablet, a desktop computer, a netbook, a multimedia player, a video streaming server, a set-top box, or a computer.

18. A video decoder for decoding a block of a picture of a video bitstream, the video decoder comprising processing circuitry and a memory comprising instructions which, when executed by the processing circuitry, cause the video decoder to:
    decode a first block of the picture;
    parse syntax elements for a second block of the picture from the video bitstream to determine a curve to use to create a non-straight line, the curve from a set of available curves that are based on a block size of the first block, wherein the set of available curves is different for different block sizes;
    determine an intra-prediction mode for the second block, for which second block the intra-prediction is made from pixels in the first block along the non-straight line that is created based on the curve determined to use; and
    decode the second block using the determined intra-prediction mode.

19. The video decoder according to claim 18, the memory comprises further instructions which, when executed by the processing circuitry, cause the video decoder to:
- determine the set of available curves from a plurality of sets of available curves based on the block size of the first block, wherein different ones of the plurality of the sets of available curves are based on different block sizes of the first block.

20. The video decoder according to claim 19, wherein the memory comprises further instructions which, when executed by the processing circuitry, cause the video decoder to select an angular mode as a starting direction of the non-straight line.

21. The video decoder according to claim 18, wherein the non-straight line is an explicitly defined curve stored in a look-up table.

22. The video decoder according to claim 18, comprised in any one of a User Equipment (UE), a mobile telephone, a tablet, a desktop computer, a netbook, a multimedia player, a video streaming server, a set-top box, or a computer.

* * * * *